US012438637B2

(12) United States Patent
Robinson et al.

(10) Patent No.: US 12,438,637 B2
(45) Date of Patent: Oct. 7, 2025

(54) METHODS AND APPARATUS FOR LATTICE-BASED SIGNAL MODULATION USING A GENERALIZATION OF POLAR CODES

(71) Applicant: Rampart Communications, Inc., Linthicum Heights, MD (US)

(72) Inventors: Matthew Brandon Robinson, Millersville, MD (US); Stephen Douglas Mackes, Crofton, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 99 days.

(21) Appl. No.: 18/377,984

(22) Filed: Oct. 9, 2023

(65) Prior Publication Data

US 2024/0146452 A1    May 2, 2024

Related U.S. Application Data

(60) Provisional application No. 63/414,666, filed on Oct. 10, 2022.

(51) Int. Cl.
*H04L 1/00* (2006.01)
*H03M 13/00* (2006.01)
(Continued)

(52) U.S. Cl.
CPC .......... *H04L 1/0057* (2013.01); *H04L 27/366* (2013.01); *H03M 13/13* (2013.01)

(58) Field of Classification Search
CPC .. H04L 1/0057; H04L 27/366; H03M 13/251; H03M 13/134; H03M 13/13; H03M 13/618
See application file for complete search history.

(56) References Cited

U.S. PATENT DOCUMENTS

| 7,036,071 B2 | 4/2006 | Shany et al. |
| 7,606,320 B2 | 10/2009 | Chae et al. |
| (Continued) | | |

FOREIGN PATENT DOCUMENTS

| EP | 1608081 A2 | 12/2005 |
| WO | WO-2023164435 A1 | 8/2023 |

OTHER PUBLICATIONS

Chen et al., A New Construction of Nonbinary Polar Codes with Two-stage Polarization, Jan. 24, 2018, 5 pages, https://arxiv.org/pdf/1801.08059v1 (Year: 2018).*

(Continued)

*Primary Examiner* — Justin R Knapp (57) ABSTRACT

A method includes receiving a bit string at a processor, performing an error correction, and causing transmission of a modulated signal. The error correction includes identifying a set of binary strings based on the bit string, mapping each binary string from the set of binary strings to a first abelian group element from a set of first abelian group elements, and applying a generalization of polar codes to the set of first abelian group elements to produce a set of second abelian group elements. The error correction also includes mapping each of the second abelian group elements to an in-phase/quadrature (I/Q) point from a set of I/Q points and identifying real-valued points based on the set of I/Q points, each of the real-valued points representing an I/Q point from the set of I/Q points. The modulated signal has a modulation that is based on the real-valued points.

20 Claims, 5 Drawing Sheets

(51) Int. Cl.
*H03M 13/13* (2006.01)
*H04L 27/36* (2006.01)

(56) References Cited

U.S. PATENT DOCUMENTS

| | | | | |
|---|---|---|---|---|
| 8,660,208 | B2* | 2/2014 | Brillant | H04L 27/36 329/304 |
| 8,989,283 | B1 | 3/2015 | Dabiri | |
| 9,172,578 | B1 | 10/2015 | Dabiri | |
| 9,692,456 | B1 | 6/2017 | Dabiri | |
| 10,523,489 | B1* | 12/2019 | Sharpe | H04L 27/3405 |
| 11,121,808 | B2* | 9/2021 | Chatterjee | H04L 1/0041 |
| 12,184,306 | B2* | 12/2024 | Iqbal | H03M 13/27 |
| 2012/0082023 | A1* | 4/2012 | Higuchi | H04L 27/2634 370/310 |
| 2019/0258936 | A1* | 8/2019 | Shamir | G06N 5/01 |
| 2023/0291632 | A1 | 9/2023 | Robinson et al. | |
| 2024/0146334 | A1* | 5/2024 | Niu | H04L 1/0058 |

OTHER PUBLICATIONS

Şaşoğlu, E., et al., "Polarization for arbitrary discrete memoryless channels", 2009 IEEE Information Theory Workshop, IEEE (2009); 1-12.

Şaşoğlu, E., "Polar codes for discrete alphabets", 2012 IEEE International Symposium on Information Theory Proceedings, IEEE, (2012); 2137-2141.

Blake, I. F., "The Leech lattice as a code for the Gaussian channel", Information and Control (1971); 19(1): 66-74.

Choi, J., et al., "Spatial lattice modulation for MIMO systems" ,IEEE Transactions on Signal Processing (Jun. 15, 2018); 66(12): 3185-3198.

Conway, J., et al., "A fast encoding method for lattice codes and quantizers", IEEE Transactions on Information Theory (Nov. 1983); IT-29(6): 820-824.

Conway, J., et al., "Fast quantizing and decoding and algorithms for lattice quantizers and codes", IEEE Transactions on Information Theory (Mar. 1982); IT-28(2): 227-232.

Costello, D. J., et al., "Channel coding: The road to channel capacity", Proceedings of the IEEE (2007); 95(6): 1150-1177.

Forney, G. D., "A bounded-distance decoding algorithm for the Leech lattice, with generalizations", IEEE Transactions on Information Theory (Jul./Aug. 1989); 35(4): 906-909.

Forney, G. D., "Coset codes. I. Introduction and geometrical classification", IEEE Transactions on Information Theory (Sep. 1988); 34(5): 1123-1151.

Forney, G. D., "Coset codes. II. Binary lattices and related codes", IEEE Transactions on Information Theory (Sep. 1988); 34(5): 1152-1187.

Forney, G. D., et al., "Efficient modulation for band-limited channels", IEEE Journal On Selected Areas In Communications (Sep. 1984); SAC-2(5): 632-647.

Forney, G. D., et al., "Modulation and coding for linear Gaussian channels", IEEE Transactions on Information Theory (Oct. 1998); 44(6): 2384-2415.

Forney, G. D., et al., "Multidimensional constellations—Part 1: Introduction, figures of merit, and generalized cross constellations", IEEE Journal on Selected Areas in Communications (1989); 7(6): 877-892.

International Search Report and Written Opinion for International Application No. PCT/US2023/062953, mailed on Jun. 7, 2023, 17 pages.

Khandani, A. K., et al., "An efficient block-based addressing scheme for the nearly optimum shaping of multidimensional signal spaces", IEEE Transactions on Information Theory (Nov. 1995); 41(6): 2026-2031.

Khandani, A. K., et al., "Shaping multidimensional signal spaces. I. Optimum shaping, shell mapping", IEEE Transactions on Information Theory (Nov. 1993); 39(6): 1799-1808.

Khandani, A. K., et al., "Shaping multidimensional signal spaces. II. Shell-addressed constellations." IEEE Transactions on Information Theory (Nov. 1993); 39(6): 1809-1819.

Lang, G. R., et al., "A Leech lattice modem", IEEE Journal on Selected Areas in Communications (Aug. 1989); 7(6): 968-973.

Mirani, A., et al., "Low-complexity geometric shaping", Journal of Lightwave Technology (2020); 39(2): 363-371.

Sahebi, A. G., et al., "Multilevel polarization of polar codes over arbitrary discrete memoryless channels", 2011 49th Annual Allerton Conference on Communication, Control, and Computing (Allerton), IEEE (2011); 1-41.

Shannon, C. E., "Probability of error for optimal codes in a Gaussian channel", Bell System Technical Journal (May 1959); 38(3): 611-656.

Stern, S., et al., "Lattice-reduction-aided precoding for coded modulation over algebraic signal constellations", WSA 2016; 20th International ITG Workshop on Smart Antennas, VDE, Munich, Germany (Mar. 9-11, 2016); 8 pages.

Ungerboeck, G., "Channel coding with multilevel/phase signals", IEEE transactions on Information Theory (Jan. 1982); IT-28(1): 55-67.

Wachsmann, U., et al., "Multilevel codes: Theoretical concepts and practical design rules", IEEE Transactions on Information Theory (Jul. 1999); 45(5): 1361-1391.

Wu, H., et al., "A lattice based approach to the construction of multi-dimensional signal constellations", Acta Electronica Sinica (Sep. 2014); 42(9): 1672-1679 with English Abstract.

Zamir, R., "Lattice Coding for Signals and Networks: A Structured Coding Approach to Quantization, Modulation, and Multiuser Information Theory", Cambridge University Press (2014); 1-21; 39 pages.

\* cited by examiner

METHODS AND APPARATUS FOR LATTICE-BASED SIGNAL MODULATION USING A GENERALIZATION OF POLAR CODES

CROSS-REFERENCE TO RELATED APPLICATIONS

This application claims priority to and the benefit of U.S. Provisional Patent Application No. 63/414,666, filed Oct. 10, 2022 and titled "METHODS AND APPARATUS FOR LATTICE-BASED SIGNAL MODULATION USING A GENERALIZATION OF POLAR CODES," the contents of which are incorporated by reference herein in their entirety.

FIELD

The present disclosure relates to digital communications, and more specifically, to the combined use of generalized bit-to-symbol and symbol-to-bit maps with forward error correction (FEC) as part of a wireless digital communications scheme.

BACKGROUND

A lattice is a periodic arrangement of points in an n-dimensional space. Communications engineers and information theorists often use lattices for quantization and modulation, for example to perform lossy compression ("source coding") and/or noise immunity ("channel coding").

Polar codes are a state-of-the-art class of FEC codes, achieving the symmetric capacity of memoryless channels with an explicit construction, and are decoded with a low-complexity algorithm. Several generalizations of polar codes exist in the literature, such as polar codes over alphabets of prime cardinality and over finite fields.

SUMMARY

In some embodiments, a method includes receiving a bit string at a processor, and identifying a set of binary strings based on the bit string. Each binary string from the set of binary strings is mapped to a first abelian group element from a plurality of first abelian group elements. A generalization of polar codes is applied to each first abelian group element to produce a plurality of second abelian group elements, and each second abelian group element is mapped to some signal in-phase/quadrature (I/Q) constellation, in a way that respects the natural geometry of the underlying group. The set of constellation points can be from a lattice-based signal constellation, a traditional Quadrature Amplitude Modulation (QAM), or any other I/Q constellation. Real-valued points from the set of constellation points are identified based on the mapping and/or based on the I/Q constellation, each real-valued point representing an I/Q point. A signal is transmitted, or caused to be transmitted, the signal having a modulation that is based on the real-valued points.

In some embodiments, a method includes encoding a plurality of data bits into an index value. The index value is included within a plurality of index values, in $\Lambda/r\Lambda$, where $\Lambda$ is a lattice and r is a number of bits in the plurality of data bits. The method also includes modulating the plurality of index values into a plurality of lattice points of a lattice group, and converting each lattice point from the plurality of lattice points to a baseband in-phase/quadrature (I/Q) point from a plurality of in-phase/quadrature (I/Q) points. The method also includes causing transmission of a signal having a modulation based on the plurality of I/Q points.

In some embodiments, a non-transitory, processor-readable medium storing instructions that, when executed by a processor, cause the processor to receive a signal representing an encoded plurality of symbols. Each symbol from the plurality of symbols represents an encoded binary string from a plurality of binary strings, and each encoded binary string from a plurality of binary strings is encoded using a generalization of polar codes. A data structure including probabilities of transmission is identified based on the plurality of symbols, and the signal is decoded based on the data structure of probabilities of transmission, using successive cancellation, to identify the plurality of binary strings.

DETAILED DESCRIPTION

According to some embodiments of the present disclosure, forward error correction (FEC) is performed using both a generalized bit-to-symbol map and a generalized symbol-to-bit map, for digital communications. For example, (1) a generalization of polar codes to groups larger than $\mathbb{F}2$, or to arbitrary finite abelian groups, and (2) a generalization of polar codes over finite abelian groups with modulation onto a lattice, may be combined into a communications scheme that combines mixed modulation types and error correction rates. As used herein, the term "generalization" refers to an error correcting scheme for any abelian group that restricts, in the case of Z/2Z, to the polar codes as described herein.

Generalizations of Polar Codes

Known generalizations of polar codes include generalizations of work originally done by Sasoglu, et al. (see, e.g., "Polarization for Arbitrary Discrete Memoryless Channels," *Information Theory*, Aug. 2, 2009, the contents of which are incorporated by reference herein in their entirety). Some such known generalizations follow the patterns of successful generalizations of linear block codes that led to Reed-Solomon codes, which are over finite fields. In one theoretical work, Sasoglu et al. showed, in the same year that polar codes themselves came out, that polar codes are extendible to prime and prime power sized alphabets using finite field arithmetic. For the prime power alphabet size in particular, Sasoglu used arithmetic from $\mathbb{Z}/r\mathbb{Z}$ and the same generator matrix as a polar code. Prime powers were included via finite field structure, and not using a $\mathbb{Z}/r\mathbb{Z}$ structure, which Sasoglu proved failed to polarize.

Later, in another theoretical work, Sasoglu showed that similar arguments can extend to any alphabet size by finding a more exotic groupoid structure to use, rather than the straightforward arithmetic of $\mathbb{Z}/r\mathbb{Z}$. See, e.g., "Polar Codes for Discrete Alphabets," *IEEE International Symposium on Information Theory Proceedings* (ISIT), 2012 ("Sasoglu 2"), the contents of which are incorporated by reference herein in their entirety). Sasoglu 2 also failed to show how to polarize arbitrary alphabets, and showed only that it is possible to polarize arbitrary alphabets. Neither Sasoglu nor Sasoglu 2 showed any gain beyond that of binary polar codes. In fact, this work proved that $\mathbb{Z}/4\mathbb{Z}$ does not polarize.

In yet another theoretical work, in 2012, Sahebi et al. showed that there exist theoretical generalizations that achieve capacity for any finite alphabet and any abelian group structure on that alphabet (see, e.g., "Multilevel Polarization of Polar Codes Over Arbitrary Discrete Memoryless Channels," *Information Theory*, Jul. 7, 2011, the contents of which are incorporated by reference herein in their entirety). Sahebi showed that the general phenomenon that occurs when using the same generator matrix is multiple levels of polarization, and therefore that one could use $\mathbb{Z}/4\mathbb{Z}$ to polarize and achieve capacity using cosets of subgroups. No reference is made by Sahebi, however, to a practical modulation, encoding, or decoding scheme. Stated another way, Sahebi does not discuss any concrete implementations or measurable gains, much less in the context of a communication system.

None of the foregoing works makes any reference to encoding bits into codewords, converting those codewords into modulated baseband I/Q, or how to practically transmit that modulated I/Q over a channel of any kind. Moreover, there is no reference whatsoever made in the foregoing works to how to receive the signal, how to correct errors or decode a codeword, or how to recover a data message. To the inventors' knowledge, no known literature discusses actual coding performance related to the foregoing works. For example, there are no known published bit error rate (BER) curves, receiver operating characteristic (ROC) curves, etc., pertaining to this technology.

Arbitrary Group/Lattice Constellations

Forward error correction methods set forth herein, in some embodiments, can be used in conjunction with one or more dense lattice constellations. Dense constellations in higher dimensional signal spaces can be used in digital communications. Examples of lattice-based and efficient constellation mappings can be found, by way of example, herein and/or in U.S. Patent Application Publication Number US 2023/0291632, published Sep. 14, 2023 and titled "Methods and Apparatus for Signal Modulation Using Lattice-Based Signal Constellations," the contents of which are incorporated by reference herein in their entirety. Dense constellations in higher dimensional signal spaces facilitate the use of lower energy to attain the same minimum distance between points of the constellation. Known schemes that combine coding theory with modulation, such as trellis coded modulation and multilevel codes, involve the use of coded bits to specify subsets of a constellation, such as a lattice coset, to determine the modulation of a point.

Lattice-Based Signal Constellations and Modulation

One known idea within the wireless communications community is to use points in higher dimensional spaces that are more "dense" than the usual quadrature amplitude modulation/amplitude and phase-shift keying (QAM/APSK) constellations. This allows greater distance (e.g., Hamming distance or Euclidean distance) between the constellation points, which decreases the probability that channel noise or other channel distortions will cause an error. There have also been many attempts to combine coding theory with modulation, such as trellis coded modulation and multilevel codes.

Many approaches use either a coding theoretic construction (e.g., one of the approaches discussed in Conway, J and Sloane, N, "Sphere Packings, Lattices, and Groups, Springer, 1993) or a lattice constellation without underlying coding.

Known coding theoretic construction approaches typically include breaking a lattice, or a set of lattices, into a set of lattice cosets. A set of coded bits is then used to select a coset (as a subset of the lattice or set of lattices), and a set of uncoded bits is used to select a point within the subset. For example, a set of message bits may be run through a standard (binary) error correcting code (e.g., a convolutional encoder), and the output (encoded) bits are used to select a coset. The remaining message bits are then used to select a point within that coset.

Another known approach is to use a lattice constellation without underlying coding, but instead to use an elaborate series of lookup tables (which becomes intractable at higher throughputs/larger constellations), or to use more geometrically convenient shaping regions such as rectangles (which reduce the efficiency of the constellations).

Methods and systems also exist to facilitate bit-to-symbol mapping and symbol-to-bit mapping for a lattice-based constellation, for example in a modem/baseband processor and for mapping bits into complex baseband I/Q points, irrespective of any underlying coding theoretic schemes, and without singling out closest elements of the lattices. In some instances, these methods and systems do not use lookup-tables to map bit strings to lattice points, or to subsets of lattice points. Still further, in some instances, these methods and systems do not use rectangular shaping regions.

A lattice can refer to a set of points in an n-dimensional space given by all linear combinations with integer coefficients of a basis set of up to n linearly independent vectors. One example of a lattice is a Leech lattice. As used herein, a Voronoi region of a lattice point can refer to the region of the n-dimensional space closer to that lattice point than to all other lattice points. Said differently, the Voronoi region $R_v(0)$ of a lattice $\Lambda$ is the set of points that are at least as close to 0 as to any other point in $\Lambda$; e.g., the Voronoi region is essentially the decision region of a maximum-likelihood decoding algorithm for $\Lambda$ (up to the ambiguity involved in resolving ties on the boundary). A code is a finite set of codewords having a specified length, a codeword being a sequence of symbols encoding a message to be transmitted within a communication system. Codewords are translated into signals (coded signals) via modulation to real and/or complex values. Coded signals can be represented as points within a signal space. A lattice code is defined by a finite set of lattice points within a predefined region of a given lattice, the predefined region referred to herein as a "shaping region."

Figure 1:
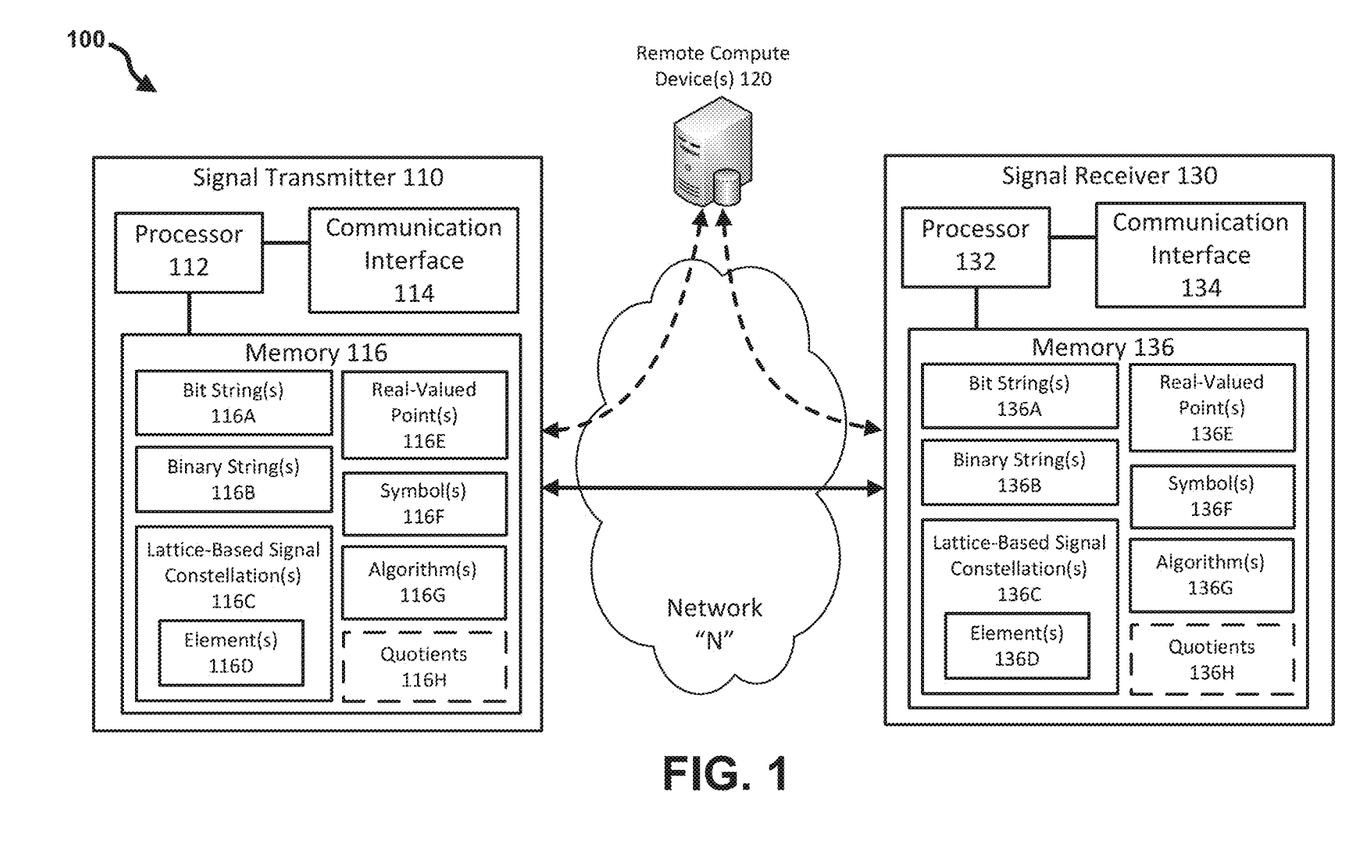
FIG. 1 is a diagram of a lattice-based data modulation system, according to an embodiment.

FIG. 1 is a diagram of a lattice-based data modulation system, according to an embodiment. The lattice-based data modulation system 100 can be used, for example, for remediating signal distortion by correcting timing and frequency offsets. As shown in FIG. 1, the lattice-based data modulation system 100 includes a signal transmitter 110 in communication (e.g., via a wired or wireless communications network "N") with a signal receiver 130. Optionally, one or both of the signal transmitter 110 and signal receiver 130 is also in communication (e.g., via a wired or wireless communications network "N") with one or more remote compute devices 120 (e.g., for remote storage of data). The signal transmitter 110 includes a processor 112 operably coupled to a communications interface 114 and to a memory 116. The memory 116 stores data and/or processor-executable instructions. For example, as shown in FIG. 1, the memory 116 includes bit strings 116A, binary strings 116B, lattice-based signal constellations 116C (including lattice elements 116D), real-valued points 116E, symbols 116F (e.g., rits and/or groups of bits, as described herein), algorithms 116G (e.g., one or more closest vector algorithms), and optionally quotients 116H. Similarly, the signal receiver 130 includes a processor 132 operably coupled to a communications interface 134 and a memory 136. The memory 136 stores data and/or processor-executable instructions. For example, as shown in FIG. 1, the memory 136 includes bit strings 136A, binary strings 136B, lattice-based signal constellations 136C (including lattice elements 136D), real-valued points 136E, symbols 136F, algorithms 136G (e.g., one or more closest vector algorithms), and optionally quotients 136H.

According to some embodiments of the present disclosure, a generalization of polar codes is performed that allows for a combination of lattice modulation (such as the lattice modulation described above and/or in U.S. Patent Application Publication Number US 2023/0291632) and forward error correction into a single framework. Any practical lattice modulation scheme that respects the group structure of $\mathbb{Z}/r\mathbb{Z}$ (as explained below) is compatible with the systems and methods described herein.

Polar codes use a generator matrix given by:

$$G = \begin{pmatrix} 1 & 1 \\ 0 & 1 \end{pmatrix}, \quad (1)$$

which can be referred to as the "generator matrix," or the "polarizing kernel" of a polar transform. The generator matrix can be viewed as acting on the left on a column vector of binary entries. The arithmetic is over the field $\mathbb{F}_2$, so if this acts on the bits $(b_0, b_1)^T$, the first transformed value is the Xor sum of the first two $(b_0 \oplus b_1)$, and the second transformed value is simply the second bit b 1. In other words, the matrix G takes $(b_0, b_1)$ to $(b_0 \oplus b_1, b_1)$.

Generalizing to Larger Integer Lattices

In some embodiments, the matrix G introduced above is used as part of a generalization, but the arithmetic is to the natural Z-module structure on the chosen abelian group such as $\mathbb{Z}/r\mathbb{Z}$, where r is an integer valued power of 2. The expression $r=2^n$ is taken to be a power of 2 greater than 2, and the addition involved with the application of G is then taken to be in the abelian group, for example, mod r. By way of example, if r=4, then the input vectors are elements of the set {0, 1, 2, 3}, and the addition is mod 4. If the input is the vector (3, 2), then after applying G, one obtains (3+2, 2) mod 4=(1, 2).

Note that when only using multiplication by 1, the transformation is always invertible by the generator matrix:

$$G^{-1} = \begin{pmatrix} 1 & -1 \\ 0 & 1 \end{pmatrix} \quad (2)$$

In other words, the transformation can be inverted by taking the difference (mod r) of the received values. From the example above, consider the vector (1, 2). The difference is 1−2=−1, from which one obtains −1 mod 4=3. This results in the vector (3, 2), which is correct.

It is noteworthy that abelian group structures like $\mathbb{Z}/r\mathbb{Z}$ typically do not admit a field structure, however the foregoing generalization makes no reference even to the ring structure of $\mathbb{Z}/r\mathbb{Z}$, and as such there is no issue. According to some embodiments, instead of being a matrix over $\mathbb{Z}/r\mathbb{Z}$, the generator matrix is a matrix of integers conveying repeated addition rather than ring multiplication.

Similarly, the Kronecker powers $G^n = G^{\otimes n}$ of the generator matrix G, which are the generators for the larger polar codes, are inverted by the Kronecker powers of the inverse of the generator $G_n^{-1} = (G-1)^{\otimes n}$. In fact, since every abelian group is a module over $\mathbb{Z}$, taking operations in this module structure, the same generator matrix is invertible for any abelian group. Hence, given an abelian group $\mathcal{G}$, the nth Kronecker power of the generator matrix gives a $\mathbb{Z}$-linear automorphism of $\mathcal{G}^{2^n}$.

Generalizing to Arbitrary Lattice Quotients

Taking into account the foregoing, it is possible to use the matrix G to encode a vector of values in $\mathbb{Z}/r\mathbb{Z}$ (referred to herein as integers modulo r, or "rits"—integers from 0 to r−1, where r is identified with 0), where $\mathbb{Z}$ is a vector of integers and r is a number of values, into a code word (note that when r=2, rits are bits), by applying the Kronecker product $G^{\otimes n}$ to the vector of rits.

In some embodiments, a generalization from an abelian group such as $\mathbb{Z}/r\mathbb{Z}$ to an embedded arbitrary lattice $\Lambda$ is obtained using a combination of the foregoing discussion about the matrix G with lattice-based and efficient constellation mappings such as those discussed above and/or in U.S. Patent Application Publication Number US 2023/0291632. For example, in some embodiments, a method for obtaining a generalization from an abelian group such as $\mathbb{Z}/r\mathbb{Z}$ to an embedded arbitrary lattice $\Lambda$ includes mapping bit strings to a finite distinguished subset of an infinite lattice by taking the quotient (in a quotient group context) by a scaled copy of the lattice so that the points lie in a scaled Voronoi region, creating the finite lattice constellation $\Lambda/r\Lambda$. While any lattice modulation is compatible with the embodiments set forth herein, some of the structures described herein and/or in U.S. Patent Application Publication Number US 2023/0291632 may be particularly suitable because there is a natural isomorphic mapping from $(\mathbb{Z}/r\mathbb{Z})^n$ into a lattice quotient $\lambda/r\lambda$, thereby equipping the lattice quotient with an efficient map onto a representative subset of $\lambda$.

Consider, for example, an ordered basis B for an n-dimensional lattice $\Lambda^n$. The basis is an isomorphism from $\mathbb{Z}^n$ (an n-dimensional vector of integers) to points of $\Lambda^n$. Furthermore, note that B restricts to an isomorphism of subgroups $\lambda \mathbb{Z}^n \to \lambda \Lambda^n$ for $\lambda \in \mathbb{Z}$. Illustrating this below, notice that since the square on the left side of the diagram commutes, the composition of the basis with the quotient map Q has kernel ("ker") $\lambda \mathbb{Z}^n$ (i.e., ker(Q∘B)=$\Lambda \mathbb{Z}^n$). Now, by the universal property of cokernels, there exists a unique homomorphism, $\sigma: \mathbb{Z}^n/\lambda \mathbb{Z}^n \to \Lambda^n/\lambda \Lambda^n$ that makes the square on the right commute.

$$\begin{array}{ccccc} \mathbb{Z}^n & \xrightarrow{\lambda} & \mathbb{Z}^n & \longrightarrow & \mathbb{Z}^n/\lambda\mathbb{Z}^n \\ {\scriptstyle B}\downarrow & & {\scriptstyle B}\downarrow & & {\scriptstyle \sigma}\downarrow \\ & & & & \end{array}$$

-continued $$\Lambda^n \xrightarrow{\lambda} \Lambda^n \xrightarrow{Q} \Lambda^n/\lambda\Lambda^n$$

By employing the same strategy using $B^{-1}$, a map $\tau:\Lambda^n/\lambda\Lambda^n \to \mathbb{Z}^n/\lambda\mathbb{Z}^n$ is obtained, which makes the right-side commute. Therefore, $\tau=\sigma^{-1}$, making a an isomorphism. So, the quotient $\Lambda^n/\lambda\Lambda^n$ is isomorphic as an abelian group to the quotient $\mathbb{Z}^n/\lambda\mathbb{Z}^n$. The space $\mathbb{Z}^n/\lambda\mathbb{Z}^n$ is the set of n copies of integers modulo $\lambda$ (i.e., of the form $(a_1, a_2, a_3, \ldots, a_n)$, where each $a_i \in (0, \ldots, \lambda-1)$. This size of this set is $\lambda^n$. And, because of the isomorphism implied by the above commutative diagram, the size of $\Lambda^n/\lambda\Lambda^n$ is also $\lambda^n$.

If the value of $\lambda$ is taken to be a power of 2 (such that $\lambda=2^k$), then the number of points in the quotient $\Lambda^n/\lambda\Lambda^n$ is $2^{nk}$. This means that there is a bijection from binary strings (or sub-strings) of length nk to the elements of the quotient $\Lambda^n/\lambda\Lambda^n$. A bijection can be defined, for example, as a function that is both injective and surjective. In other words, for every element in the domain, there is a unique element in the codomain that it maps to, and every element in the codomain is mapped to by at least one element in the domain.

A key result of the foregoing is that when an isomorphism of the lattice $\Lambda$ to $\mathbb{Z}^n$ is chosen, the (geometric) Voronoi quotient map on the lattice and the component-wise arithmetic modulo r in the underlying $\mathbb{Z}$ vector of coefficients perfectly respect each other. This means that the generalization described above at (2) induces a similar group action on $\Lambda/r\Lambda$. This also means that the action of the matrix G can be taken, effectively without change, to act on the lattice. In other words, if + is taken as referring to addition in $\Lambda/r\Lambda \cong \mathbb{Z}n/r\mathbb{Z}n$, then the application of G, which takes a pair of lattice points $(\ell 1, \ell 1)$ to $(\ell 0+\ell 1, \ell 1)$, is perfectly well defined.

The inventors are unaware of any known discussion in the literature of taking a polar code over an arbitrary abelian group, for example of size $r^n$, and realizing it via modulation onto a subset of a dense lattice, $\Lambda$, in Euclidean space while retaining the group structure in $\Lambda/r\Lambda$. It is noteworthy that the benefits of such a generalization are clear. The integer lattice—which is the lattice underlying all QAM modulations—is known to not be very dense. By generalizing to an arbitrary lattice, it is possible to make use of known dense packings in various dimensions of the Hilbert spaces in which the baseband I/Q samples live. This can allow much greater separation between data-carrying constellation points for much lower total energy/power levels, as well as increased throughput for lower total energy.

By using the generalized polar coding set forth herein, gain from lattice modulations (such as those set forth herein and/or in U.S. Patent Application Publication Number US 2023/0291632) can be combined with the ability to change the rate of the effective code using state-of-the-art codes for the additive white Gaussian noise (AWGN) channel, giving greater granularity in adjusting to changing channel conditions and power levels. Approaches to mapping data bits into the foregoing framework, and to changing the rate of the resulting codes, are discussed in the sections that follow.

Bit-to-Symbol Mapping

Bit-to-Symbol Map with the Standard Integer Lattice, $\mathbb{Z}n$

In some embodiments, an encoding process is performed over $\mathbb{Z}n/r\mathbb{Z}^n$, where $\mathbb{Z}^n$ is an n-dimensional vector of integers The encoding process over $\mathbb{Z}^n/r\mathbb{Z}^n$ is identical to encoding over $\mathbb{Z}/r\mathbb{Z}$ n independent times. For example, in the context of standard QAM modulation techniques, the encoding process can be exactly equivalent to n independent copies of $\mathbb{Z}/r\mathbb{Z}$ and gives no gain over this case. As such, the arithmetic is over $\mathbb{Z}/r\mathbb{Z}$. With a standard integer lattice, the "rits" can be integers in $[0, r)$, where $r=2n$ is always a power of 2, so that $\log_2(r)$ bits can always naturally map into each rit.

As an example, if $r=4$, the integers $\{0, 1, 2, 3\}$ are used. The data bits may be broken into blocks of 2, and the following map then takes the pairs of bits to $r=4$ rits (e.g., a plurality of first abelian group elements):

$00 \mapsto 0,$ $01 \mapsto 1,$ $02 \mapsto 2,$ $03 \mapsto 3,$ (3)

If $r=8$, the rits may be $\{0, 1, 2, 3, 4, 5, 6, 7\}$, the data bits may be broken into blocks of 3, and the following map sends the blocks of 3 bits to rit values:

$000 \mapsto 0,$ $001 \mapsto 1,$ $010 \mapsto 2,$ $011 \mapsto 3,$ $100 \mapsto 4,$ $101 \mapsto 5,$ $110 \mapsto 6,$ $111 \mapsto 7.$ (4)

Similar procedures can be implemented for larger r.

In some embodiments, the foregoing values (e.g., a second plurality of abelian group elements) can be converted into baseband I/Q imitating the structure of a Quadrature Amplitude Modulation (QAM) system. For example, for $r=2$, where the rits are $\{0, 1\}$, two rits may be taken at a time—$(n_0, n_1)$—and the rits may be mapped to complex numbers $n_0+in_1$. This results in the set of points $\{0+i0, 0+i1, 1+i0, 1+i1\}=\{0, i, 1, 1+i\}$. If the point $0.5+0.5i$ (i.e., the mean of those 4 points) is subtracted from each of the foregoing points, one obtains the points $\{\pm 0.5 \pm 0.5i\}$, which is identically a QPSK.

For $r=4$, the rits are $\{0, 1, 2, 3\}$. The rits may again be arranged into pairs $(n_0, n_1)$ and the complex values $n_0+in_1$ may be formed. The total set is then $\{0, 1, 2, 3, i, 1+i, 2+i, 3+i, 2i, 1+2i, 2+2i, 3+2i, 3i, 1+3i, 2+3i, 3+3i\}$. If the mean $1.5+1.5i$ is again subtracted from each point, the 16-QAM constellation is identically recovered. Similarly, for $r=8$ the 64-QAM constellation is identically recovered, for $r=16$ the 256-QAM constellation is recovered, and so on.

Note that, over an AWGN channel, errors will appear in the rit, not in the bit values themselves. For some cases, this is not necessarily problematic. For example, in the $r=8$ example above in equation (4), an error from rit 2 to 3 results in error in a single bit. However, a rit error from 3 to 4 results in error in 2 bits. Consequently, a permutation and/or bijection can be performed such that for every block in the block-space (e.g., domain), there is a unique rit in the rit-space (e.g., codomain) that it maps to, and/or every rit in the codomain is mapped to by at least one block in the domain. For example, in some embodiments, gray coding may optionally be performed before mapping to the rits is performed. For example, in the r=8 example, the additional step shown below (in this case, a reverse gray code) may be included:

$$000 \mapsto 000 \mapsto 0,$$
$$001 \mapsto 001 \mapsto 1,$$
$$011 \mapsto 010 \mapsto 2,$$
$$010 \mapsto 011 \mapsto 3,$$
$$110 \mapsto 100 \mapsto 4,$$
$$111 \mapsto 101 \mapsto 5,$$
$$101 \mapsto 110 \mapsto 6,$$
$$100 \mapsto 111 \mapsto 7. \quad (5)$$

Now, note that any single rit error only results in a single bit error in the underlying data.

In some implementations, to construct a code, and ignoring bit freezing for the moment, the Kronecker product of G can be applied with the appropriate power to the input rits. The result will be a list of rits between 0 and r−1, which in turn can be mapped into the appropriate QAM as described above.

For example, consider a scenario in which r=4, the blocksize is 8, and a starting block of data bits is (0, 0, 1, 0, 0, 1, 0, 1, 1, 0, 1, 0, 0, 0, 1, 1). The starting block of data bits can be broken into blocks of 2(=$\log_2(r)$), yielding ((0, 0), (1, 0), (0, 1), (0, 1), (1, 0), (1, 0), (0, 0), (1,1)). These pairs can then be gray coded to obtain ((0, 0), (1, 1), (0, 1), (0, 1), (1, 1), (1, 1), (0, 0), (1, 0)), and these values can be mapped to rits, resulting in (0, 3, 1, 1, 3, 3, 0, 2). Finally, the result can be run through the Kronecker product $G^{\otimes 3}$, which returns (1, 1, 0, 3, 0, 1, 2, 2), which in turn can be mapped into the 16-QAM values, as described above.

Bit-to-Symbol Map with Arbitrary Lattices

This section represents a generalization over the previous section, but the computations are very similar—in that starting with data blocks, breaking them into blocks of data bits, potentially gray coding those blocks, and then mapping them into integer rits may remain the same. In addition to the foregoing, however, the resulting rits can be used as the coefficients of the basis vectors of the lattice $\Lambda$. Then, when the Kronecker product of the matrix G is applied, the addition becomes addition in the quotient $\Lambda/r\Lambda$ rather than addition mod r. At the end of the encoding process, a list of elements of $\Lambda/r\Lambda$ is obtained, which can then be modulated into baseband I/Q, for example using the techniques described herein and/or in U.S. Patent Application Publication Number US 2023/0291632 or similar.

An important reduction in computational complexity can be made at this point. As can be observed from the lattice constellation constructions described herein, the arithmetic in integers mod r respects the arithmetic in $\Lambda/r\Lambda$. This means that instead of replacing the Kronecker of G with addition in $\Lambda/r\Lambda$, the addition of the rits in the integers can instead be performed mod r (as at the end of the above section titled "Bit-to-Symbol Map with the Standard Integer Lattice"), followed by applying the basis of $\Lambda$ to the output integer values, and then reducing those values into $\Lambda/r\Lambda$. This procedure will yield the same result as what is described in the previous paragraph, and those points can then be mapped to I/Q in as described herein.

Note that the foregoing reduction in computational complexity does not contradict what was previously said about $\mathbb{Z}^n/r\mathbb{Z}^n$ giving no gain. The encoding can be performed over $\mathbb{Z}^n/r\mathbb{Z}^n$, but when modulation goes onto a dense lattice, independence between the rits (coefficients in $\mathbb{Z}/n\mathbb{Z}$) cannot be expected. To use the dense lattice, encoding over $\mathbb{Z}n/r\mathbb{Z}^n$ can be used.

Adjusting the Coding Rate

In the above examples, every rit in the block of 8 rits that were fed into the encoder was used (application of $G^{\otimes 3}$). In standard polar codes, the way the rate of the code (or coding rate, or the ratio of actual data bits to error correction bits) is changed is by "freezing" certain bit positions to a predefined value that is known to both the transmitter and receiver (the frozen value is typically chosen to be 0). This is because of the "polarization" effect of the matrix G, which makes some bit channels better and others worse. The degraded bit channels are frozen to 0, and the better bit channels are used for data. The fraction of unfrozen bits to total bits is the rate of the code.

According to embodiments set forth herein, the use of polar codes and the freezing of bit positions can be generalized. Consider first the case of r=4. In this case, there are 2 bits (e.g., a first bit length) per rit (e.g., a first abelian element). Ignore for now the optional gray coding, and the rits are as given in (3). With polar codes, each position is a single bit, and can be either used or not used. In this case, because there are 2 bits per rit, it is possible to "partially" freeze one or more of the rits. For example, either all 4 possible values {0, 1, 2, 3} may be used, or each rit can be completely frozen as in polar codes (resulting in a "0" being sent). In addition, when partially freezing the rit(s), in some implementations, only the most significant bit may be used (e.g., to produce a second abelian group element having a second bit length optionally different from the first bit length). In other words, only 0 or 2 (each a second abelian group element from a plurality of second abelian group elements, corresponding to (0, 0) or (1, 0)) may be used. This allows a single bit to be used in the rit, rather than both bits or no bits, and since the points 0 and 2 are farther apart (e.g., as compared to spacing associated with the first abelian group elements), there is greater spacing to allow the receiver to distinguish them from one another. Furthermore, by using a straightforward generalization of the successive cancellation decoder, information with which to decode later rits may be provided to the decoder.

When r=8, there are 3 bits per rit (e.g., the rit has an associated bit length of 3 bits), with 4 options in total for each rit—(a) use all 3 of the bits, (b) use only 2 of the bits, (c) use only 1 of the bits, or (d) completely freeze all bits and only use 0. In other words, the options are:

| | |
|---|---|
| use 3 bits | {0, 1, 2, 3, 4, 5, 6, 7}, |
| use 2 bits | {0, 2, 4, 6}, |
| use 1 bit | {0, 4}, |
| use 0 bits | {0}, (6) |

In each case, using fewer bits results in a subset of the previously used values, in a way that makes the remaining rits spaced out farther. In some implementations, a receiver is better able to distinguish between 0 and 4 than among all 8 of the original values. Furthermore, the receiver is able to determine when only 0 or 4 are transmitted, and this knowledge can be used to increase the accuracy of decoding later bits.

It is noteworthy that each reduction corresponds to a reduced constellation. In the above example with r=8, no freezing results in a 64-QAM (as discussed in the "Bit-to-Symbol Map with the Standard Integer Lattice" section). With the first partial freezing—using 2 bits instead of 3, the possible rits are {0, 2, 4, 6}, which is equivalent to a 16-QAM in that one rit. With the next partial freezing—using only 1 bit—the rits are 0 and 4, which is equivalent to a QPSK. This remains true for all values of r. For example, if r=32, the starting constellation is equivalent to a 1024-QAM. As each less significant bit is sequentially frozen, this steps individual rits down to 256-QAM, 64-QAM, 16-QAM, and QPSK. This reduction is done in each individual rit, meaning that a single code block may be a mix of all modulation schemes at once. This procedure is performed in such a manner that at the sender the smaller sub-QAM is invisible, but the information resolves in such a manner that each of these constellations appear at the hard decisions of the successive cancellation algorithm.

In some known systems, a set of "mod-cod" parameters specifies which single constellation and coding rate to use. Such systems typically use all QPSK, all 16-QAM, all 64-QAM, etc., with a single particular coding rate. Such systems typically use the channel information to decide which constellation and coding rate are to be used, taking into account that smaller constellations tend to perform better at lower signal-to-noise ratios (SNRs), but also transmit less information. The identification of modulation constellation and coding rate are typically extremely complicated decisions that involve complicated and sophisticated logic to implement.

In some embodiments of the present disclosure, in contrast with known approaches, the constellation, coding rate, and modulation scheme are all unified into a single framework. The coding rate automatically selects the appropriate constellation in each frozen rit, resulting in a mixed constellation modulation that is automatically optimized for throughput and performance. In other words, an appropriate constellation for each frozen rit can be automatically selected based on the code rate, optionally with multiple different constellations being used.

A similar unified approach can be taken for the arbitrary lattice version of these codes, in some embodiments. In some implementations, since the lattices are $\mathbb{Z}$-modules, all of the structure mentioned above will carry over directly (with the same or similar gains are possible), with the exception that after partially freezing and encoding with the Kronecker product of G, the lattice basis is applied, and the result is reduced to $\Lambda/r\Lambda$. The resulting points will no longer be analogous to QAMs, but will instead be more efficiently spaced lattice modulations.

In yet another embodiment (alternatively or in addition to the foregoing), generalizations of a polar code successive cancellation decoder—e.g., list decoding, using log-likelihoods ratios, cyclic redundancy check (CRC)-aided decoding, systematic polar codes, etc. are also compatible with the methods described herein, as further articulated below.

In some implementations, a code can be constructed such that r is arbitrarily large and/or approaches a continuous limit (e.g., the limit of r goes to infinity). Here, if the throughput of the code (e.g., the number of effective data bits) is a constant, the code can still be well defined. The following example can illustrate the effect of r being arbitrarily large and/or approaching a continuous limit.

In this example, using polar codes, an initial data word of:

(0,0,0,0,0,0,0,1,0,1,1,1,1,1,1,1)

can have a block size (i.e., a total number of bits) of 16, with 8 data bits being transmitted, resulting in a rate ½ code. In the initial data word, the 0s can be frozen and the 1s can be data positions. This code can be reflective of a beta-expansion approach to minimizing the Bhattacharyya distance of the utilized channels. Generalizing the polar code (where r=2) to a Bombe code (defined below) where r=4, the initial data word can be represented as:

(0,0,0,0,0,0,0,2,0,0,2,0,1,1,1), where the 0s can be frozen, the 1s can carry 2 bits each (so they can be from the set {0,1,2,3}), and the 2s can carry 1 bit each (so they can be from the set {0,2}). This notational choice can represent what that element is a multiple of (mod r).

Converting the r=4 Bombe code above to an r=8 Bombe code, the initial data word can then be represented as:

(0,0,0,0,0,0,0,4,0,0,0,4,0,2,2,2), where the 0s are frozen, the 2s carry 2 bits each (so they are from the set {0,2,4,6}), and the 4s carry 1 bit each (so they are from the set {0,4}).

Converting the above to an r=16 Bombe code, the initial data word can be represented as:

(0,0,0,0,0,0,0,0,8,0,0,0,8,0,4,4,4), where the notation above carries over here in a pattern-like manner.

Note that while the r=2 to r=4 case is different, from r=4 to r=8, the values simply double. The same doubling can be seen from r=4 to r=8, and from r=8 to r=16.

An alternative view of the above is in the context of the modular structure of the relevant group. For example, if the data word is normalized by the r value, the result for the r=2 (e.g., polar code) case is:

(0,0,0,0,0,0,0,1,0,1,1,1,1,1,1,1)/2=(0,0,0,0,0,0,0,½,0, ½,½,½,½,½,½,½).

The result of normalizing by r for the r=4 case is:

(0,0,0,0,0,0,0,2,0,0,2,0,1,1,1)/4=(0,0,0,0,0,0,0,½,0,0, ½,0,¼,¼,¼).

The result of normalizing by r for the r=8 case is:

(0,0,0,0,0,0,0,4,0,0,0,4,0,2,2,2)/8=(0,0,0,0,0,0,0,½,0, 0,0,½,0,¼,¼,¼).

The result of normalizing by r for the r=16 case is again:

(0,0,0,0,0,0,0,½,0,0,0,½,0,¼,¼,¼), which can indicate that the 8th and 12th components, when viewed as rotations of a circle, are a multiple of a half turn (of which there can be 2—no turn or half turn). The 14th, 15th, and 16th components can be multiples of a quarter turn (of which there are 4—no turn, quarter turn, half turn, or three-quarter turn).

This pattern can continue for larger r—doubling r can simply double the value in each component. Once the total power of the signal is normalized, in this example, there are effectively no new codes past r=4. As a result, in this example, the decoder (described below) can operate (e.g., decode) without receiving and/or using the actual value of r (e.g., the number of bits/bit length represented by r). Rather, the decoder can operate based (optionally only) on an indication that and/or configuration where r>4. Or, equivalently, if the limit as r goes to infinity is taken, but the throughput of the code (e.g., the number of effective data bits) is kept constant, the code is still well defined.

The Decoder

In some embodiments, the code described above can be decoded using a generalization of successive cancellation (i.e., a successive cancellation (SC) decoder). The successive cancellation decoding can be performed in a manner similar to that of polar decoding, e.g., performing a depth first tree search, given that correct likelihood information is used and the associated upper and lower functions for the decoder are obtained or approximated. Some options for correct likelihood information that can be used in the decoder include: 1) a complete list of the probabilities that a received symbol is one of the elements of an abelian group (see example below for clarification), 2) the discrete Fourier transform of the list of probabilities of the elements of the abelian group where the dimension of the Fourier transform is determined by the structure of the group and the modulation map, and 3) the list of the log likelihoods for each of the elements of the abelian group.

In some instances, successive cancellation can approach or achieve Shannon capacity but can have speed limitations (e.g., due to a large block size). In some implementations, a decoder for polar codes (e.g., a polar decoder) can include a substitute and/or a variant of a successive cancellation decoder. For example, a polar decoder can include a successive cancellation list (SCL) decoder, a cyclic-redundancy-check aided SCL (CA-SCL) decoder, a belief propagation (BP) decoder, a successive cancellation flip (SC-Flip and/or SCF) decoder, a cyclic-redundancy-check aided successive cancellation flip (CA-SCF) decoder, a simplified successive cancellation (simplified-SC and/or S-SC) decoder, a simplified-SCL (S-SCL) decoder, a simplified CA-SCL (S-CA-SCL) decoder, a simplified BP (S-BP) decoder, a simplified SCF (S-SCF) decoder, a simplified CA-SCF (S-CA-SCF) decoder, a successive cancellation (SC) stack-based decoder, and/or the like. In some implementations, a decoder can include, for example, a convolutional decoder, a tropical decoder, a truncated encoder, a Fourier transform-based decoder, and/or the like.

An example derivation of upper and lower functions for the decoder is as follows: given that an encoded pair, $(a, b) \mapsto (a+b, b)$, was transmitted, the receiver receives information estimating $(a+b, b)$. Assume the elements of the finite abelian group $G$, $g_1, \ldots, g_N$ have been enumerated. Let the probability that the first received symbol is $g_i$ be $q_i$, and let the probability that the second received symbol is $g_i$ be $q_i$ for $i \in \{1, 2, \ldots, N\}$. These $q_i$ terms can be estimated using the probability distribution function for the noise, or via some approximation technique. Then, since $a=(a+b)-b$, the first symbol can be estimated by subtracting the second symbol from the first. The probability distribution for a difference between random variables is obtained by a convolution of the probabilities. Hence, the estimate for the upper value may be written as a convolution of the two lists of probabilities. A discrete Fourier transform may be taken of the lists of probabilities, by performing componentwise multiplication. Similarly, given the lists of probabilities $(p_i)$ and $(q_i)$ and an estimate, $\hat{u}$, of the original upper value, $a$, two estimates may be obtained for the probability list of the second (lower) element: 1) $(q_i)$, as well as 2) $(p_i)$ permuted according to $\hat{u}$ and the group structure using the fact that $b=(a+b)-a$ and $(p_i)$ estimates $a+b$ and $\hat{u}$ estimates $a$. These two estimates for the lower entry can then be combined using one or more of: componentwise multiplication, renormalization, averaging, etc.

As an example, consider the case where the abelian group is selected to be $\mathbb{Z}/4\mathbb{Z}$, with a block-size of 16, and a coding rate of ½. Suppose a message includes the following 16 bits: 1110000100110011. Applying an inverse gray coding map to the 16 bits results in any error of ±1 in $\mathbb{Z}/4\mathbb{Z}$ being a 1 bit error, and a first bit sequence 1011000100100010 is obtained. A reliability sequence obtained by a modified beta expansion method, (16, 16, 15, 15, 14, 14, 12, 12, 8, 8, 13, 11, 13, 10, 7, 11, 6, 10, 7, 4, 6, 4, 9, 5, 9, 3, 5, 2, 3, 2, 1, 1), may then be used to generate a second bit sequence, 0000000000010000000000110001110. Reading each bit pair as an integer mod 4, one obtains (0, 0, 0, 0, 0, 0, 2, 0, 0, 0, 0, 1, 2, 0, 3, 2). Next, by applying the generator matrix with additions in $\mathbb{Z}/4\mathbb{Z}$, a codeword is obtained: (2, 3, 0, 3, 1, 2, 3, 2, 0, 3, 2, 3, 3, 2, 1, 2). Next, by modulating via the map $b \mapsto b-1.5$ in each component, I/Q values (0.5, 1.5, -1.5, 1.5, -0.5, 0.5, 1.5, 0.5, -1.5, 1.5, 0.5, 1.5, 1.5, 0.5, -0.5, 0.5) are obtained, which determine a signal for transmission. The receiver, in turn, obtains a noisy estimate of this I/Q data, such as (0.555322, 1.40993, -1.40617, 1.46, -0.524643, 0.588575, 1.12172, 0.35792, -1.74141, 1.73477, 0.5133, 1.35511, 1.34006, 0.606838, -0.489466, 0.558253), and computes for each value the probability that each symbol was transmitted:

$$\begin{pmatrix} 0 & 0.01103101 & 0.961282 & 0.0274082 \\ 0 & 0 & 0.0362831 & 0.963716 \\ 0.962649 & 0.0373508 & 0 & 0 \\ 0 & 0 & 0.0246024 & 0.975397 \\ 0.0215039 & 0.963999 & 0.0144971 & 0 \\ 0 & 0.008619 & 0.955823 & 0.0355584 \\ 0 & 0.000034731 & 0.274129 & 0.725836 \\ 0 & 0.0536961 & 0.940774 & 0.00552932 \\ 0.997352 & 0.00264815 & 0 & 0 \\ 0 & 0 & 0.00279203 & 0.997208 \\ 0 & 0.0158819 & 0.96447 & 0.0196481 \\ 0 & 0 & 0.0551567 & 0.944842 \\ 0 & 0 & 0.0617739 & 0.938225 \\ 0 & 0.00741466 & 0.951614 & 0.0409709 \\ 0.0162384 & 0.964542 & 0.0192195 & 0 \\ 0 & 0.0110437 & 0.960909 & 0.0280476 \end{pmatrix} \quad (7)$$

These computed/identified probabilities can be represented as a data structure and/or data type. The data structure(s) and/or data type(s) can include and/or be associated with, for example, a probability mass function, a probability distribution function, a likelihood ratio, a log-likelihood ratio, a matrix, and/or the like. A probability associated with a probability mass function (PMF) can include, for example, a probability associated with each of the r possible outputs of a channel. Representing a probability using a probability density function (PDF) can include, for example, using a parameterized PDF to represent a probability density of a channel output(s). A likelihood ratio (LR) can include, for example, a ratio of probabilities to a given probability (e.g., a likelihood ratio between each of the r probabilities and the probability of zero, a likelihood ratio between each of the r probabilities and the probability of receiving the maximum likelihood value, etc.). A log likelihood ratio (LLR) can include a result of taking a logarithm (e.g., a natural logarithm) to a likelihood ratio. In some implementations, values associated with a PMF, PDF, LR, LLR, and/or the like, can be truncated, such that a largest value is stored and used for a memory and/or space efficient decoder.

In some implementations, the selection of a decoder type can depend on the probability representation described above. For example, upper functions for PMF, PDF, and/or LR approaches can include convolutions, and lower functions for these approaches can include Hadamard products. In some implementations, a fast Fourier transform (FFT) can be used to perform the convolutions in the Fourier domain, which can convert probability values into simple Hadamard products. For an LLR approach, a tropical geometry following from the LogSumExp (e.g., RealSoftMax) approximation can be used.

Next, using successive cancellation with appropriate convolution based upper and lower functions, the matrix (7) decodes to (0, 0, 0, 0, 0, 0, 2, 0, 0, 0, 0, 1, 2, 0, 3, 2), which, converting back to bits and reading only the nonzero data entries, is 1011000100100010. Inverting the gray code map then returns 1110000100110011, as desired. The inventors are unaware of any known demonstration in the literature of how to practically decode the type of code discussed above.

Embodiments set forth herein include methods for encoding data bits into an index value in $\mathbb{Z}^n/r\mathbb{Z}^n$, referred to herein as a "rit," modulating the rit(s) into a lattice group, converting the lattice points to baseband I/Q, transmitting that I/Q practically over a communications channel, and then decoding it. Alternatively or in addition, in some embodiments, a coding rate is changed through partial freezing, thereby reducing an order of an effective constellation to a subgroup of an original group. Alternatively or in addition, in some embodiments, a method for decoding a data transmission includes using a generalized successive cancellation decoder, or a generalization of more sophisticated polar-like decoders (e.g. CRC-aided, list decoding, systematic codes, etc). The codes described herein can be made systematic in a manner similar to that of polar codes, by using the inverse of the generator matrix. A systematic code can include, for example, a codeword where original data is included in the codeword directly. Said differently, a systematic code can include error-correcting code in which input data (e.g., the plurality of binary strings) is embedded in an encoded output. A systematic code can reduce processing time because parity data (e.g., at least one check bit/parity bit) can be appended to the source block and/or a receiver does not need to recover original source symbols if received correctly. For example, a receiver can forward a received signal without decoding the signal if the at least one check bit does not indicate an error.

In some embodiments, a method includes encoding data based on elements of an abelian group, freezing subgroup cosets, mapping from bits to group elements, lattice modulation, decoding, and partial freezing of indices by freezing bits.

The above "Bit-to-Symbol Map with the Standard Integer Lattice" section shows how to practically encode data bits into a generalized integer lattice, e.g., to imitate standard QAMs, and the above "Bit-to-Symbol Map with Arbitrary Lattices" section shows how to do accomplish the same using more general lattice groups. Some embodiments set forth herein facilitate the selection of dense lattices as the abelian group into which user data can be mapped, and over which generalized polar codes can be implemented, thereby producing significant gain over known communication systems, and facilitating higher throughput for lower energy with fewer errors. When this work is combined with the bit-to-symbol mapping described herein, the achievable gain is enormous.

In some embodiments, a coding rate is adjusted by mapping subgroups into practical communication systems, for example by transforming the subgroups into transmittable constellation points, while reducing the constellation order by lowering the rate of the code.

Figure 2:
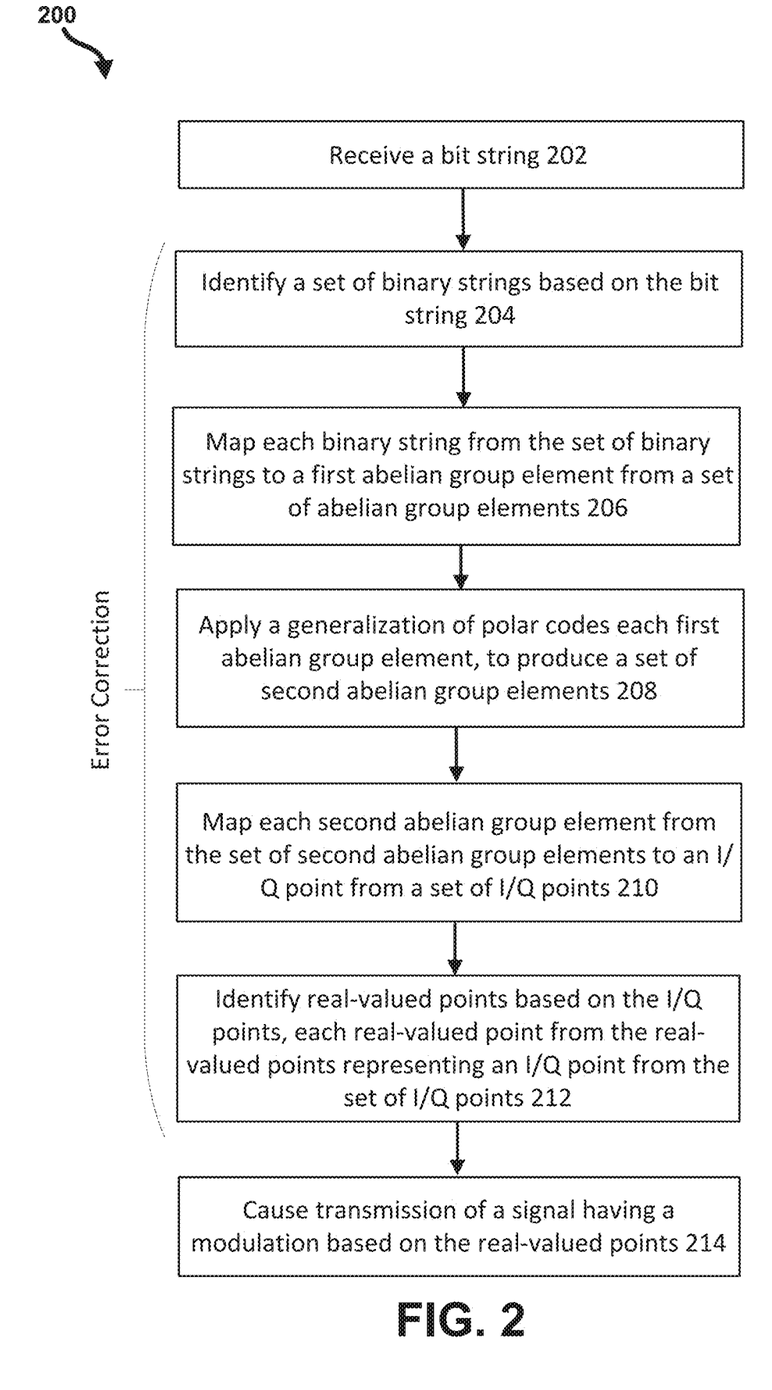
FIG. 2 is a flowchart illustrating a first data encoding/signal modulation method, according to an embodiment.

As shown in FIG. 2, a method 200 includes receiving a bit string at a processor, at 202, and performing an error correction by identifying, at 204, a set of binary strings based on the bit string. At 206, the method 200 includes mapping each binary string from the plurality of binary strings to a first abelian group element (e.g., a rit) from a plurality of first abelian group elements, and at 208, applying a generalization of polar codes to the plurality of first abelian group elements to produce a plurality of second abelian group elements (e.g., the rit after partial freezing). Each second abelian group element is mapped at 210 to an I/Q point from a plurality of I/Q points (e.g., a constellation), in a way that respects the natural geometry of the underlying group. In other words, there is a quasi-isometric embedding of the abelian group with the natural word metric determined by the standard basis onto an open subset of I/Q space with the Euclidean metric. The plurality of I/Q points can be from a lattice-based signal constellation, a traditional Quadrature Amplitude Modulation (QAM), or any other I/Q constellation. Real-valued points from the set of constellation points are identified at 212, based on the mapping and/or based on the I/Q constellation, with each real-valued point representing an I/Q point. A signal is transmitted at 214, having a modulation that is based on the real-valued points.

In some implementations, the plurality of I/Q points is a lattice-based signal constellation. In other implementations, the modulation is a Quadrature Amplitude Modulation (QAM). In some implementations, the real-valued points represent in-phase/quadrature (I/Q) points or components. In some implementations, a method (e.g., the method 200) can further include applying at least one of a permutation or a bijection to each binary string from the plurality of binary strings prior to performing the mapping of the second abelian group elements to the plurality of I/Q points. In some implementations, the at least one of the permutation or the bijection can include at least one of a gray code or a reverse gray code. In some implementations, the generalization of polar codes can include a systematic code. In some implementations, the plurality of first abelian group elements can be associated with a first bit length and the plurality of second abelian group elements can be associated with a second bit length.

In some implementations, the plurality of I/Q points is a lattice-based signal constellation, and the medium further storing instructions to cause the processor to reduce an order of an effective constellation associated with the lattice-based signal constellation to a subgroup using partial freezing of at least one binary string from the plurality of binary strings.

Figure 3:
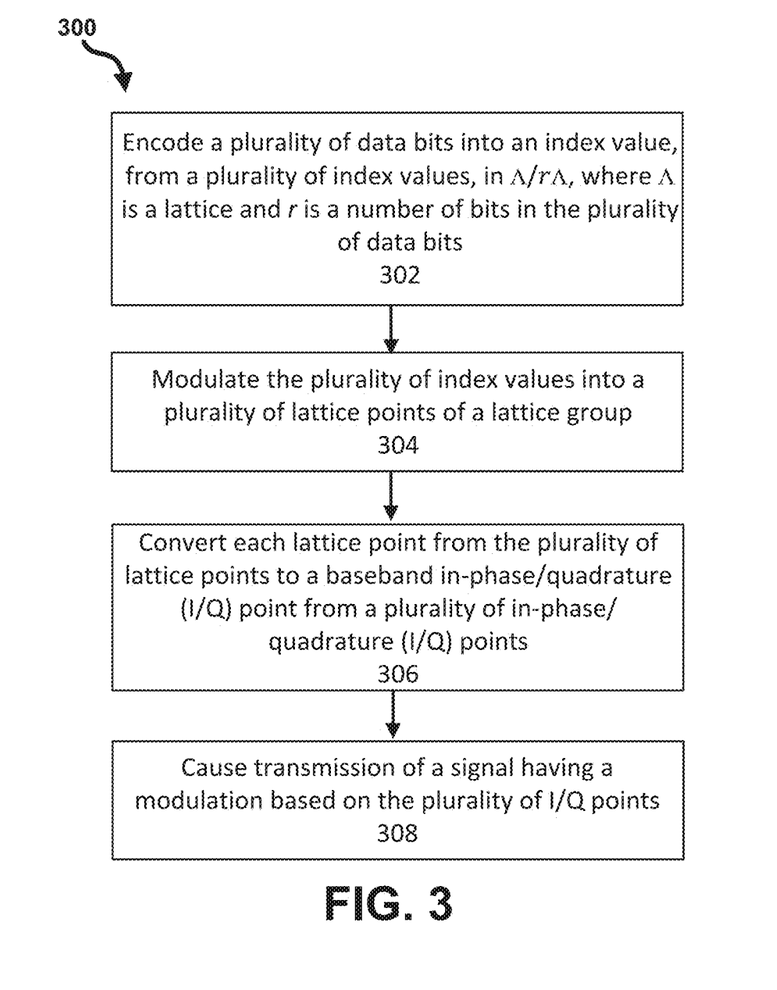
FIG. 3 is a flowchart illustrating a second data encoding/signal modulation method, according to an embodiment.

As shown in FIG. 3, in some embodiments, a method 300 includes encoding, at 302, a plurality of data bits into an index value, from a plurality of index values, in $\Lambda/r\Lambda$, where $\Lambda$ is a lattice and r is a number of bits in the plurality of data bits (e.g., r=2 or r>2). The plurality of index values is modulated, at 304, into a plurality of lattice points of a lattice group. Each lattice point from the plurality of lattice points is converted, at 306, to a baseband in-phase/quadrature (I/Q) point from a plurality of in-phase/quadrature (I/Q) points. The method 300 also includes causing transmission of a signal at 308, the signal having a modulation based on the plurality of I/Q points.

In some implementations, the decoder can be configured to decode the signal based on the number of bits being greater than a minimum value and without receiving an indication of the number of bits. In some implementations, the number of bits can be associated with a continuous limit and/or can be arbitrarily large. In some implementations, the index value can be associated with an abelian group element. In some implementations, each bit from a subset of bits from the plurality of data bits can be associated with a data position from a plurality of data positions and the subset of data bits can be selected from the plurality of bits based on an indication of a channel capacity. In some implementations, the modulation can be quadrature amplitude modulation (QAM).

Figure 4:
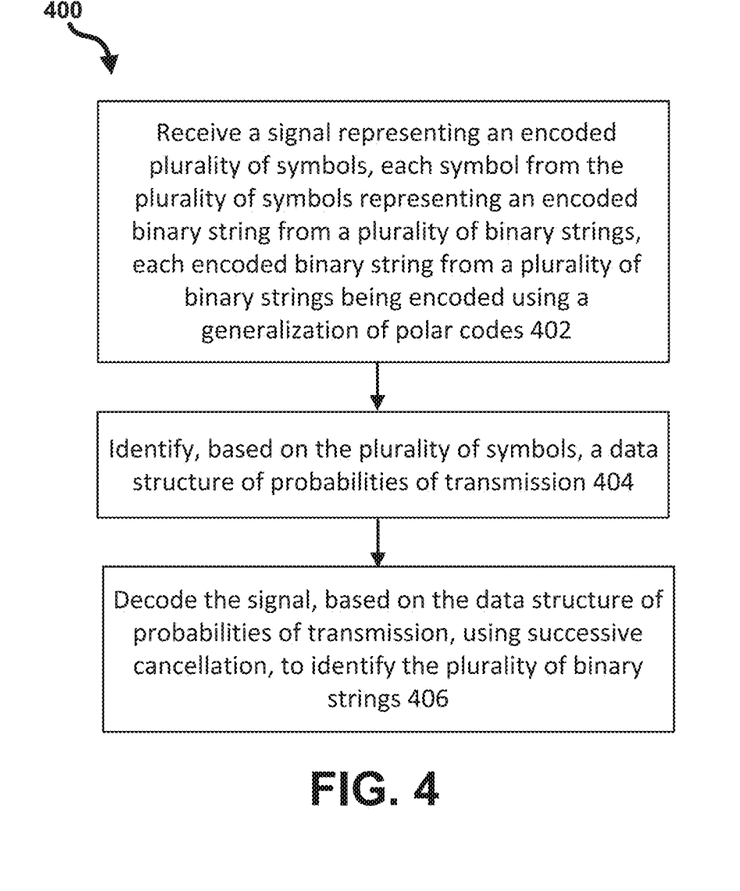
FIG. 4 is a flowchart illustrating a method for decoding a received signal, according to an embodiment.

As shown in FIG. 4, in some embodiments, a signal decoding method 400 includes receiving, at 402, a signal representing an encoded plurality of symbols, each symbol from the plurality of symbols representing an encoded binary string from a plurality of binary strings, and each encoded binary string from a plurality of binary strings being encoded using a generalization of polar codes. The method 400 also includes identifying, at 404, a data structure of probabilities of transmission based on the plurality of symbols, and at 406, decoding the signal, based on the data structure of probabilities of transmission, using successive cancellation, to identify the plurality of binary strings. Optionally, the decoding of the signal at 406 can include inverting a gray code map.

In some implementations, at least one probability of transmission can be associated with at least one of a probability mass function, a probability distribution function, a likelihood ratio, or a log-likelihood ratio. In some implementations, the decoder can include at least one of a convolutional decoder, a tropical decoder, a truncated decoder, or a Fourier transform-based decoder, and the decoder can be configured to decode the plurality of symbols without receiving an indication of a number of bits associated with each symbol. In some implementations, the signal can include a representation of the plurality of binary strings. In some implementations, the method 400 can further include forwarding the signal without decoding the signal based on at least one check bit and the representation of the plurality of binary strings.

Figure 5:
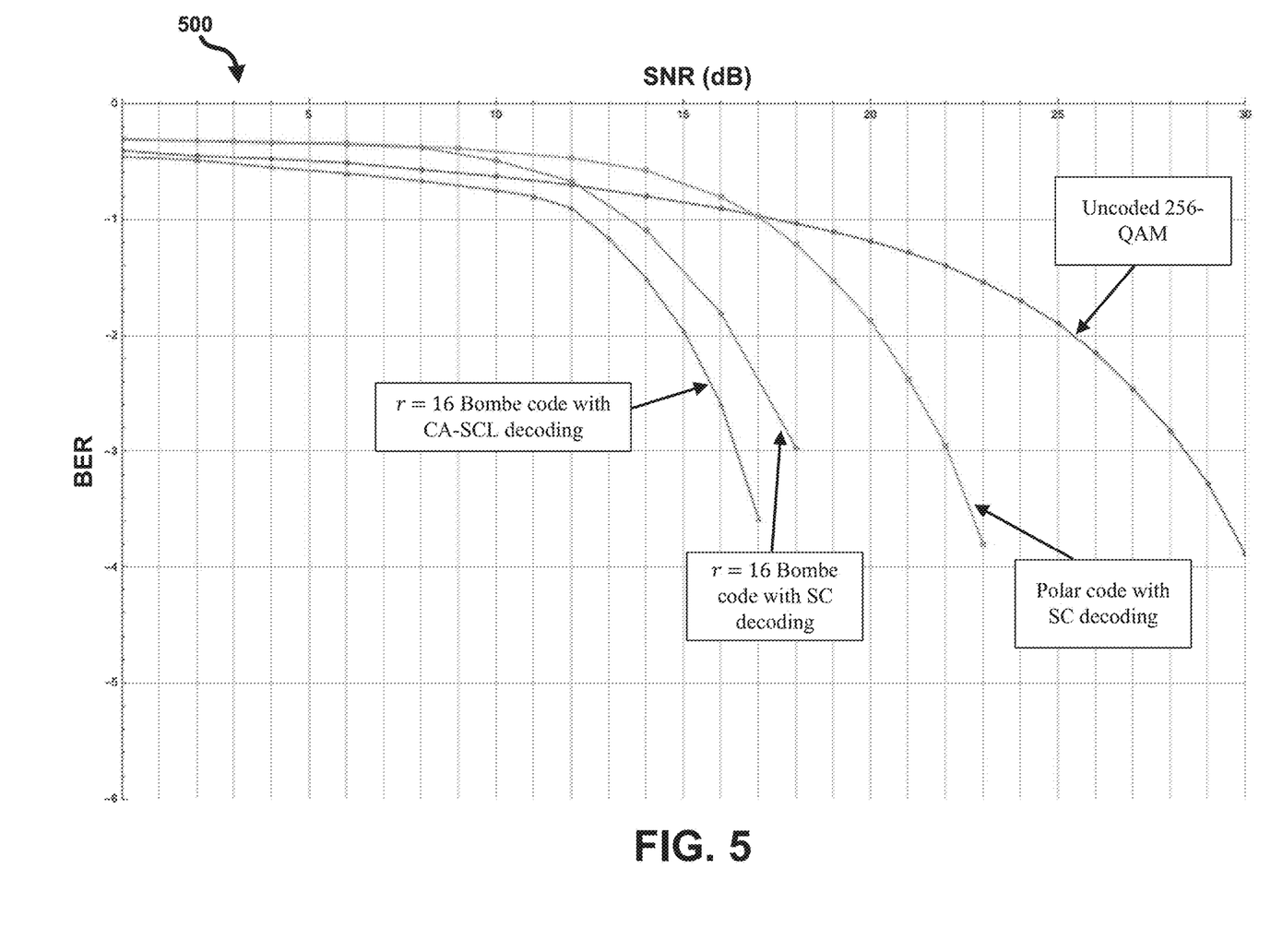
FIG. 5 is a graph showing signal-to-noise ratio (in decibels, dB) versus log 10 (bit error rate (BER)) curves for multiple different modulation schemes, according to an embodiment.

FIG. 5 is a graph showing signal-to-noise ratio (in decibels, dB) versus log 10(bit error rate (BER)) curves for multiple different modulation schemes, according to an embodiment. The x-axis of the graph 500 represents a signal to noise ratio measure (SNR and/or SNR per bit) in decibels (dB), which can include, for example, a ratio between the signal energy associated with each bit (or each user data bit) and a noise spectral density (e.g., a noise power in a 1 Hz bandwidth). The y-axis of the graph 500 represents a bit error rate (BER) (e.g., Log 10(BER)). The data represented in the graph 500 include (1) data associated with an uncoded 256-QAM scheme, (2) data associated with a standard polar code scheme (block size 64, rate ½) with successive cancellation (SC) decoding, (3) data associated with an r=16 Bombe code (block size 64, rate ½) with successive cancellation decoding, and (4) data associated with an r=16 Bombe code (block size 64, rate ½) with CA-SCL decoding. Curves appearing toward the left in the graph are preferable since they represent modulation schemes that can achieve a given BER with a lower SNR as compared with modulation schemes of curves appearing toward the right in the graph. As the graph 500 illustrates, the data associated with an r=16 Bombe code with successive cancellation indicates a gain of 4 dB, which indicates that the Bombe code can result in improved bit error rate performance compared to, for example, a polar code. Additionally, as shown in the data associated with the r=16 Bombe code with CA-SCL decoding, methods of improving a polar code scheme (e.g., by using CA-SCL decoding instead of successive cancellation decoding) can improve a Bombe code-based scheme as well.

Some embodiments of the present disclosure implement what may be referred to as "Bombe codes," defined as a block code and modulation scheme that uses the polar generating matrix with arithmetic over the Z module structure of an abelian group, together with a lattice modulation or map (which may include a QAM, lattice constellations as set forth in U.S. Patent Application Publication Number US 2023/0291632, etc.).

Implementations of the various techniques described herein may be implemented in digital electronic circuitry, or in computer hardware, firmware, software (executed or stored in hardware), or in combinations of them. Implementations may be implemented as a computer program product, i.e., a computer program tangibly embodied, e.g., in a machine-readable storage device (computer-readable medium, a non-transitory computer-readable storage medium, a tangible computer-readable storage medium, etc.), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A non-transitory, processor-readable medium storing instructions that, when executed by a processor, cause the processor to:
   receive a bit string;
   perform an error correction by:
      identifying a plurality of binary strings based on the bit string,
      mapping each binary string from the plurality of binary strings to a first abelian group element from a plurality of first abelian group elements,
      applying a generalization of polar codes to the plurality of first abelian group elements to produce a plurality of second abelian group elements,
      mapping each second abelian group element from the plurality of second abelian group elements to an in-phase/quadrature (I/Q) point from a plurality of I/Q points; and
      identifying a plurality of real-valued points based on the plurality of I/Q points, each real-valued point from the plurality of real-valued points representing an I/Q point from the plurality of I/Q points; and
   cause transmission of a signal having a modulation based on the plurality of real-valued points.

2. The non-transitory, processor-readable medium of claim 1, wherein the plurality of I/Q points is included in a lattice-based signal constellation.

3. The non-transitory, processor-readable medium of claim 1, wherein the modulation is a Quadrature Amplitude Modulation (QAM).

4. The non-transitory, processor-readable medium of claim 1, further storing instructions to cause the processor to apply at least one of a permutation or a bijection to each binary string from the plurality of binary strings prior to performing the mapping of the second abelian group elements to the plurality of I/Q points.

5. The non-transitory, processor-readable medium of claim 4, wherein the at least one of the permutation or the bijection includes at least one of a gray code or a reverse gray code.

6. The non-transitory, processor-readable medium of claim 1, wherein the plurality of I/Q points is a lattice-based signal constellation, the non-transitory, processor-readable medium further storing instructions to cause the processor to reduce an order of an effective constellation associated with the lattice-based signal constellation to a subgroup using partial freezing of at least one binary string from the plurality of binary strings.

7. The non-transitory, processor-readable medium of claim 1, wherein the generalization of polar codes includes a systematic code.

8. The non-transitory, processor-readable medium of claim 1, wherein the plurality of first abelian group elements is associated with a first bit length and the plurality of second abelian group elements is associated with a second bit length different than the first bit length.

9. A method comprising:
   receiving a bit string;
   identifying a plurality of binary strings based on the bit string;
   mapping each binary string from the plurality of binary strings to a first abelian group element from a plurality of first abelian group elements;
   applying a generalization of polar codes to the plurality of first abelian group elements to produce a plurality of second abelian group elements;
   mapping each second abelian group element from the plurality of second abelian group elements to an in-phase/quadrature (I/Q) point from a plurality of I/Q points;
   identifying a plurality of real-valued points based on the plurality of I/Q points, each real-valued point from the plurality of real-valued points representing an I/Q point from the plurality of I/Q points; and
   transmitting a signal having a modulation based on the plurality of real-valued points.

10. The method of claim 9, wherein the plurality of I/Q points is included in a lattice-based signal constellation.

11. The method of claim 9, further comprising applying at least one of a permutation or a bijection to each binary string from the plurality of binary strings prior to performing the mapping of the second abelian group elements to the plurality of I/Q points.

12. The method of claim 11, wherein the at least one of the permutation or the bijection includes at least one of a gray code or a reverse gray code.

13. The method of claim 9, wherein the plurality of I/Q points is a lattice-based signal constellation, the method further comprising reducing an order of an effective constellation associated with the lattice-based signal constellation to a subgroup using partial freezing of at least one binary string from the plurality of binary strings.

14. The method of claim 9, wherein the plurality of first abelian group elements is associated with a first bit length and the plurality of second abelian group elements is associated with a second bit length different than the first bit length.

15. An apparatus comprising:
   a communication interface configured to transmit and receive wireless signals; and
   a processor configured to:
      receive a bit string;

identify a plurality of binary strings based on the bit string,
map each binary string from the plurality of binary strings to a first abelian group element from a plurality of first abelian group elements,
apply a generalization of polar codes to the plurality of first abelian group elements to produce a plurality of second abelian group elements,
map each second abelian group element from the plurality of second abelian group elements to an in-phase/quadrature (I/Q) point from a plurality of I/Q points;
identify a plurality of real-valued points based on the plurality of I/Q points, each real-valued point from the plurality of real-valued points representing an I/Q point from the plurality of I/Q points; and
cause the communication interface to transmit a signal having a modulation based on the plurality of real-valued points.

16. The apparatus of claim 15, wherein the plurality of I/Q points is included in a lattice-based signal constellation.

17. The apparatus of claim 15, wherein the processor is further configured to apply at least one of a permutation or a bijection to each binary string from the plurality of binary strings prior to performing the mapping of the second abelian group elements to the plurality of I/Q points.

18. The apparatus of claim 17, wherein the at least one of the permutation or the bijection includes at least one of a gray code or a reverse gray code.

19. The apparatus of claim 15, wherein the plurality of I/Q points is a lattice-based signal constellation, the processor further configured to reduce an order of an effective constellation associated with the lattice-based signal constellation to a subgroup using partial freezing of at least one binary string from the plurality of binary strings.

20. The apparatus of claim 15, wherein the plurality of first abelian group elements is associated with a first bit length and the plurality of second abelian group elements is associated with a second bit length different than the first bit length.

* * * * *